(12) United States Patent
Cooke et al.

(10) Patent No.: US 7,407,392 B2
(45) Date of Patent: Aug. 5, 2008

(54) POWER AND DATA STATION

(75) Inventors: Marvin R. Cooke, St. Louis, MO (US); Conrad Marini, Woodbridge (CA)

(73) Assignee: Doug Mockett & Company, Inc., Torrance, CA (US)

( * ) Notice: Subject to any disclaimer, the term of this patent is extended or adjusted under 35 U.S.C. 154(b) by 56 days.

(21) Appl. No.: 11/605,885

(22) Filed: Nov. 29, 2006

(65) Prior Publication Data
US 2008/0121147 A1  May 29, 2008

(51) Int. Cl.
*H01R 13/44* (2006.01)

(52) U.S. Cl. .......................... 439/131; 439/536; 108/62; 312/223.6

(58) Field of Classification Search ................ 439/131, 439/536, 925; 174/58, 221, 222, 57, 59; 108/62; 312/223.6; 16/221, 222
See application file for complete search history.

(56) References Cited

U.S. PATENT DOCUMENTS

| | | | | |
|---|---|---|---|---|
| 3,622,684 A | * | 11/1971 | Press .......................... 174/486 |
| 4,984,982 A | * | 1/1991 | Brownlie et al. ............ 439/131 |
| 5,122,069 A | * | 6/1992 | Brownlie et al. ............ 439/131 |
| 5,124,506 A | * | 6/1992 | Briggs et al. .................. 174/67 |
| 5,195,288 A | | 3/1993 | Penczak |
| 5,230,552 A | * | 7/1993 | Schipper et al. .......... 312/223.6 |
| 5,575,668 A | * | 11/1996 | Timmerman ................ 439/131 |
| 5,755,582 A | | 5/1998 | Charlton |
| D407,374 S | | 3/1999 | Byrne |
| 6,085,667 A | | 7/2000 | Gevaert et al. |
| 6,338,301 B1 | | 1/2002 | Almond |
| D460,736 S | | 7/2002 | Pincek et al. |
| D466,868 S | | 12/2002 | Gershfeld |
| D472,213 S | | 3/2003 | Byrne |
| 6,802,577 B2 | | 10/2004 | Gershfeld |

* cited by examiner

*Primary Examiner*—Tulsidas C. Patel
*Assistant Examiner*—Harshad C Patel
(74) *Attorney, Agent, or Firm*—Lewis Brisbois Bisgaard & Smith LLP; Sanford Astor

(57) ABSTRACT

A power and data station rotatably mounted in an opening in a work surface comprising, a base having sloped power and data receptacle panels, a pair of torus hinges rotatably attached to said base, a lock bolt having a lock tooth fixedly attached to said base, a lock button slidably attached to said lock bolt, a first lock strike slot in one of said torus hinges, said lock tooth adapted to engage said lock strike slot to hold said station in an open position.

20 Claims, 6 Drawing Sheets

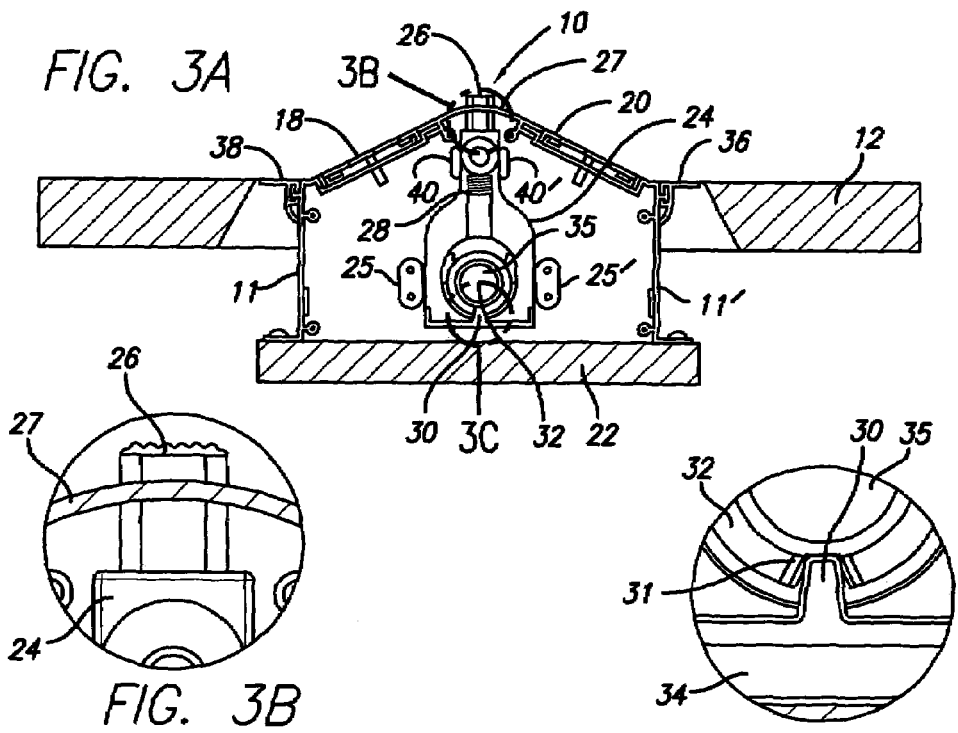
FIG. 3A
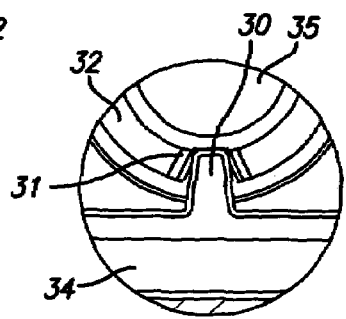
FIG. 3B
FIG. 3C
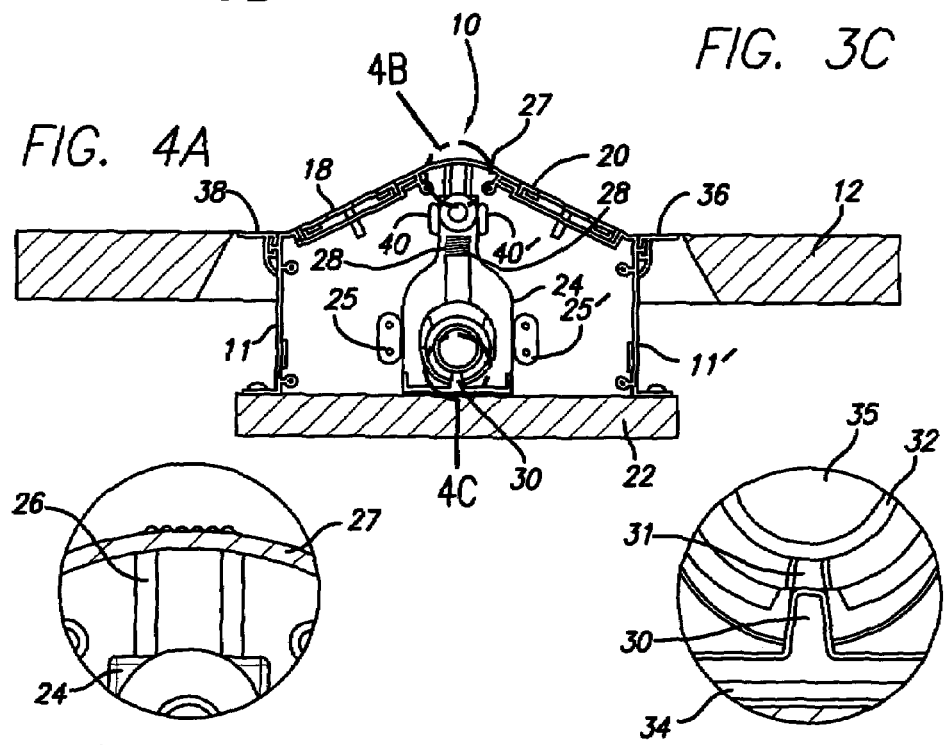
FIG. 4A
FIG. 4B
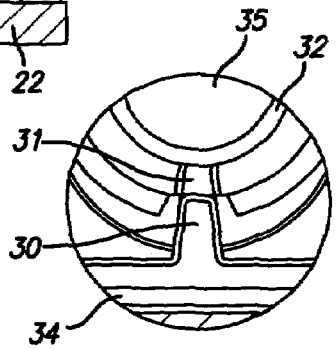
FIG. 4C

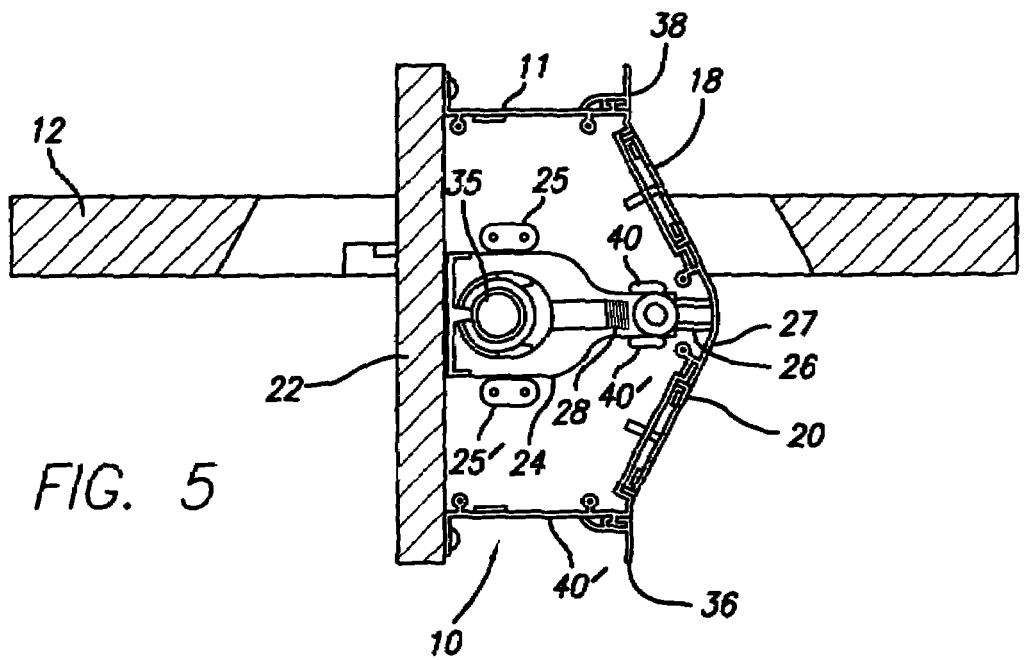
FIG. 5
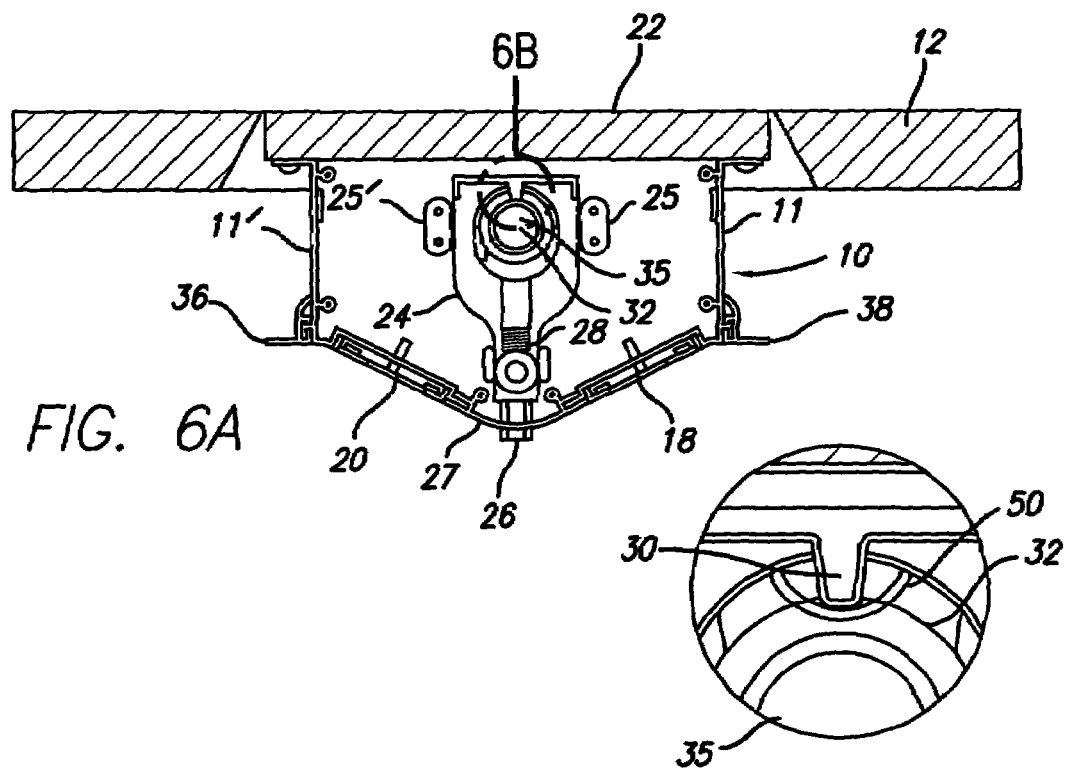
FIG. 6A
FIG. 6B

POWER AND DATA STATION

FIELD OF THE INVENTION

This invention relates to a power and data station to supply electric, phone, video and data lines into a work surface, such as a conference table, boardroom table or office desk.

BACKGROUND OF THE INVENTION

There is a need for an aesthetically pleasing method of supplying electric, phone and data lines into conference and boardroom tables. Present solutions to this problem generally involve a metal box with or with out a lid, making it difficult for a designer to integrate it into furniture in a pleasing manner. Some designers solve this problem by recessing the box beneath a hinged access door, but this creates the problem of how to open the door, and how to avoid damaging the adjacent surface of the table while doing so.

Other designers offer interfaces that raise and lower the device, but these are all dependent on expensive electric devices to raise and lower the interface, resulting in a very expensive unit prone to failures of opening and closing.

BRIEF DESCRIPTION OF THE INVENTION

This invention provides a station device, called herein a power and data station, for carrying electric, phone, video and data lines into work surfaces, such as conference and boardroom tables, which opens and closes manually and is entirely concealed below the work surface when closed. To open the unit, one has simply to depress one side of the top panel and the unit rolls over 180 degrees and stops against a concealed built-in stop block. To close the unit, one only has to depress the lock button and push on the same side and the unit will roll back to its closed position, coming to rest against the concealed stop block.

The design is such that the table work surface may be cut out in a rectangular aperture and the cutout panel used for the top cover on the interface. This cutout feature will work on a wide variety of tabletop thicknesses, without affecting the geometry of the rotating interface station base. The interface receptacles are mounted on both sloped "roof top" panels, allowing access from both sides of the table.

A lock bolt mechanism is provided internally in the station base to secure the unit in the open and closed positions. The unit is easily rotated 180 degrees from its open to its closed position. Wiring is fed into the station base through the center of torus hinges at each end of the outlet box. Plastic strain relief connectors, which pass through the torus hinges, are used to secure the wiring from being pulled out of the receptacles and insure that the wires rotate with the station. The torus hinges are fastened to the station base, which is screwed to the bottom of the work surface cutout panel, in a manner to align the station top panel into the work surface cutout aperture.

OBJECTS OF THE INVENTION

It is an object of the invention to provide an electrical grommet to supply electric, phone and data lines into conference and boardroom tables.

Another object of the invention is to provide a method of supplying electric, phone and data lines into conference and boardroom tables, which opens and closes manually and is entirely concealed below the work surface when closed.

BRIEF DESCRIPTION OF THE DRAWINGS

FIG. 3A is a section view in the open locked position;
FIG. 3B is a detailed view of the lock button;
FIG. 3C is a detailed view of the unit locked;
FIG. 4A is a section view in the open unlocked position;
FIG. 4B is a detail view of the lock button depressed to unlock;
FIG. 4C is a detail view of the unit unlocked
FIG. 5 is a section view of the unit rotated 90 degrees;
FIG. 6A is a section view of the unit closed;
FIG. 6B is detail view of the unit semi-locked closed.

DETAILED DESCRIPTION OF THE INVENTION

Referring now to FIGS. 1-9, there is shown power and data station 10 set into the tabletop of a work surface, such as a conference or boardroom table 12. Station 10 is in the open position, exposing a plurality of power receptacles 14 and 15 and data ports 16 and 17. Power receptacles 14, 15 are located in panels 18 and 20 and data ports 16, 17 are located in panels 18 and 20 of station 10. Panels 18 and 20 are both sloped, set at an angle to the horizontal, which makes power receptacles 14, 15 and data ports 16, 17 easier to use and easier to access.

Figure 1:
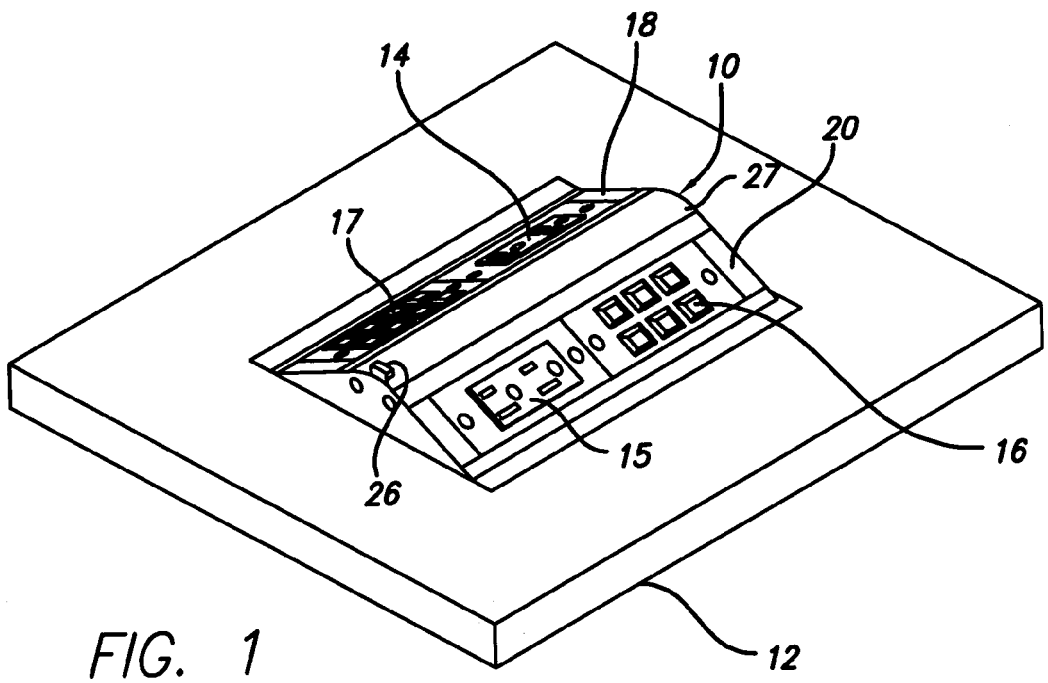
FIG. 1 is a perspective view of the power and data station of this invention in the open position.
Figure 2:
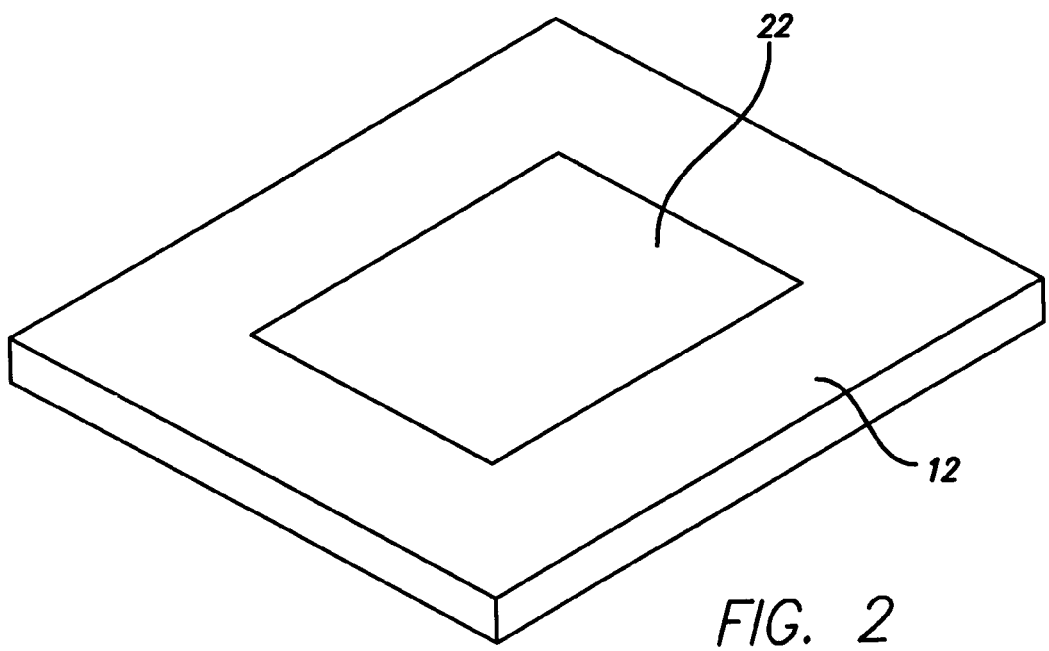
FIG. 2 is a perspective view of the power and data station in the closed position.
Figure 7A:
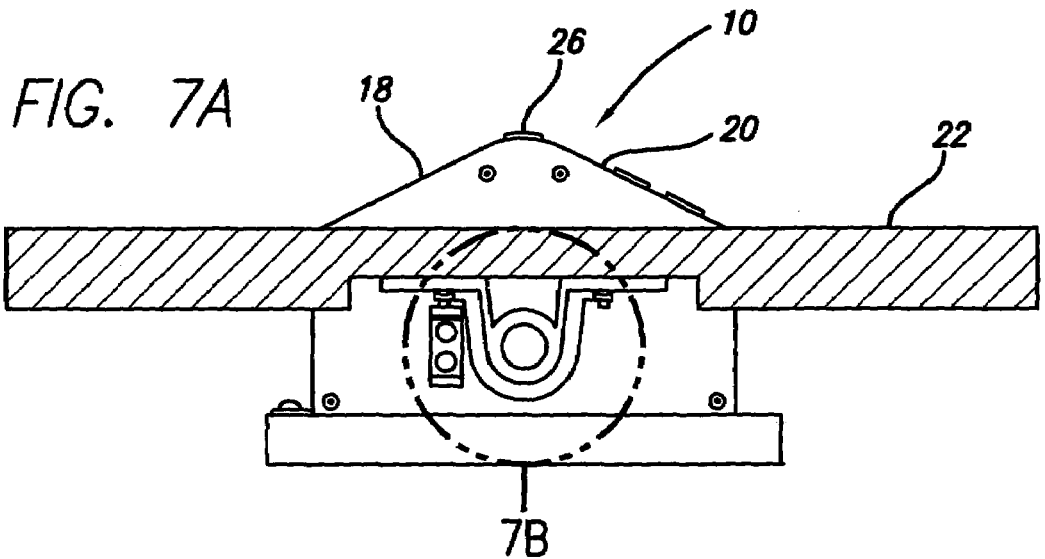
FIG. 7A is an elevational view showing the hinge and station in the open position.
Figure 7B:
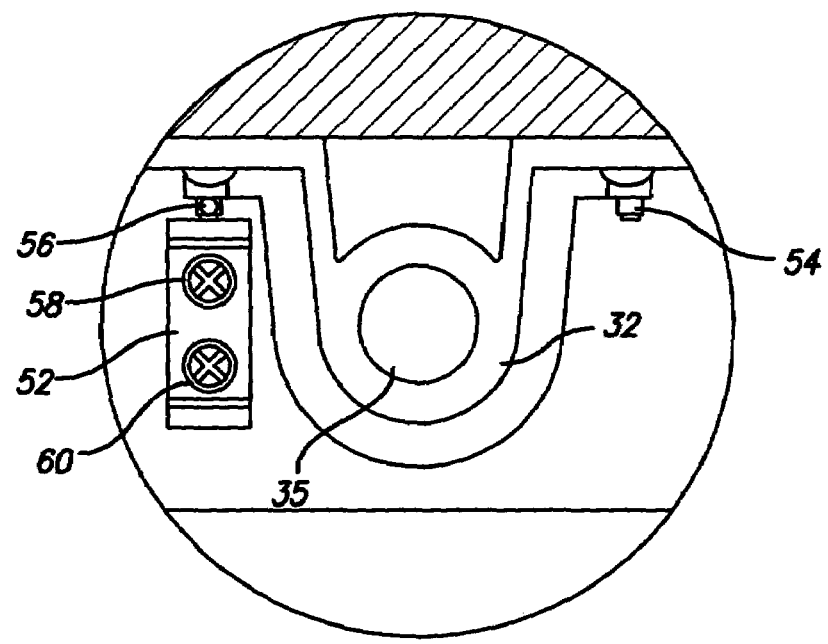
FIG. 7B is a detail of the hinge.
Figure 8A:
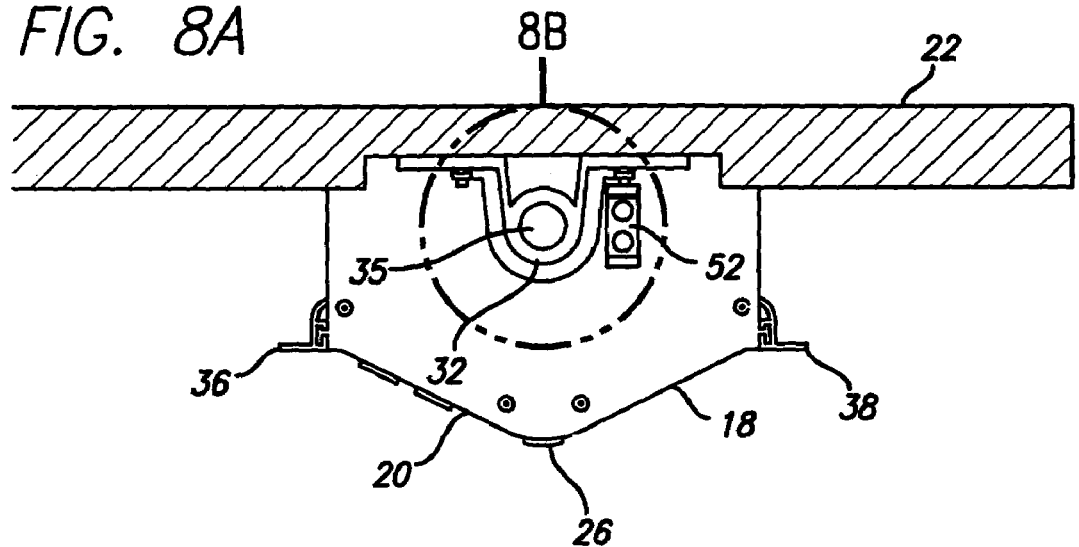
FIG. 8A is an elevational view showing the hinge and station in the closed position.
Figure 8B:
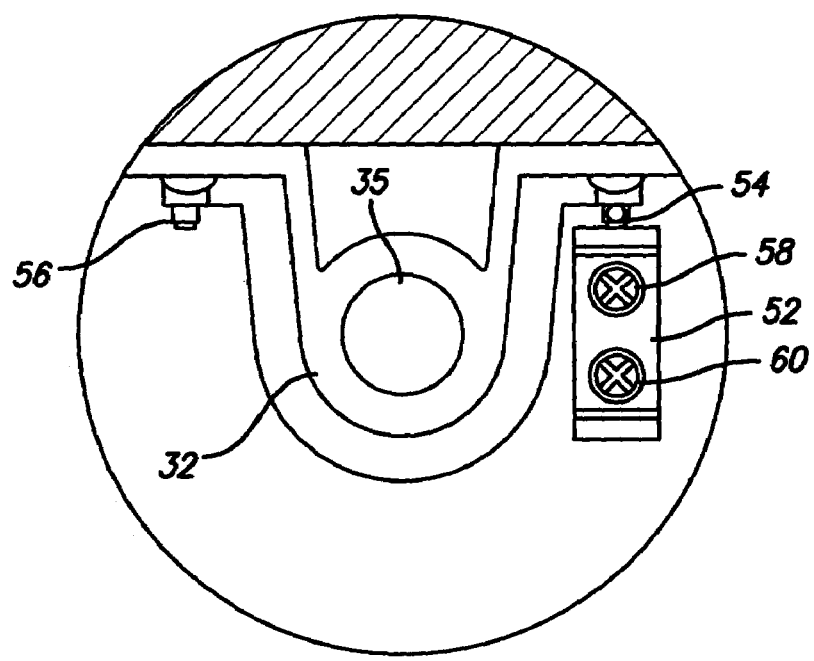
FIG. 8B is a detail view of the hinge; and,
FIG. 9 is an exploded view of the invention.

FIG. 2 shows station 10 rotated 180 degrees to its closed position in table 12. Panel 22 of table 12, was cut out from the work surface to form the cavity for placement of station 10, or is a separate panel made to fit the cut-out area and match its color and texture, if desired. Station 10 is affixed to one side of panel 22, so that when station 10 is rotated 180 degrees, panel 22 fits flush with, and completely fills the opening in table 12.

Referring to FIGS. 3A, 3B, and 3C, there is shown a cross-section of station 10 in the locked-open mode. The base or body of station 10 comprises vertical panels 11 and 11' to which are attached sloped panels 18 and 20 and end plates 68 and 70. Vertical panels 11 and 11' are fixedly attached to table piece 22, making the entire station 10 fixedly attached to table piece 22. Station 10, affixed to table piece 22, stays fixed together, even during rotation of station 10, providing a stable support for the electrical and data connections.

A lock bolt 24 locks station 10 in the open position. Lock bolt 24 is held in position by lower lock bolt guides 25 and 25' and upper lock bolt guides 40 and 40'. Lock button 26 is slidably attached to lock bolt 24 and fits through slot 29 in ridge panel 27. In the hinge locked position, lock bolt tooth 30 fits into lock strike slot 31 of torus hinge 32. When lock button 26 is depressed, lock bolt tooth 30 moves downward into space 34, out of lock strike 31, releasing station 10, allowing it to rotate 180 degrees on torus hinges 32 and 32'. When pressure is released on lock button 26, spring 28 urges lock button 26 to its upward position, shown in FIGS. 3A and 3B.

Two flexible seal wing members 36 and 38 act as loose fitting seals to prevent foreign objects from falling into the gap between station 10 and the table top aperture when the unit is open.

Wiring is fed to an outlet from the power and data panels 18 and 20 through center holes 35, 37 of torus hinges 32, 32' at each end of the base outlet box. Plastic strain relief connectors, which pass through the torus hinges, may be used to secure the wiring from being pulled out of the receptacles and insure that the wires rotate with the outlet box. Torus hinges 32, 32' are fastened to end panels 68, 70, which attach to vertical panels 11, 11' and panels 18, 20.

Referring to FIGS. 4A, 4B, and 4C, there is shown the hinge unlocked position in which lock bolt tooth 30 is pushed out of lock strike slot 31 by depression of lock button 26, which moves lock bolt 24 downward.

Referring to FIGS. 5, 6A and 6B, there is shown station 10 as it is rotating 90 degrees clockwise (FIG. 5) from its open position to 180 degrees rotation (FIG. 6A) to its closed position. The rotation is accomplished by pushing down on lock button 26, moving lock bolt tooth 30 out of lock strike slot 31 and by then pushing down on side 20.

Lock strike 50 is more shallow than lock strike 31 and is also curved, concave, so that station 10 can be returned to the open position by simply pushing panel 22, rotating station 10 counterclockwise, back to the open position. Lock bolt tooth 30 rides up and out of lock strike 50, which is shallow and has a curved surface, with a small amount of pressure applied. This is done since it not possible to depress lock button 26 when the station is in its closed position.

Referring to FIGS. 7A, 7B, 8A and 8B, there is shown an end view of torus hinge 32 which has stop block 52 affixed thereto. When station 10 is rotated 180 degrees to both the open and closed position, stop block 52 impacts either adjustable stop screw 54 or 56, which stops the rotation of station 10 in the proper level, horizontal position. Screws 58 and 60 attach stop block 52 to end plate 70.

Figure 9:
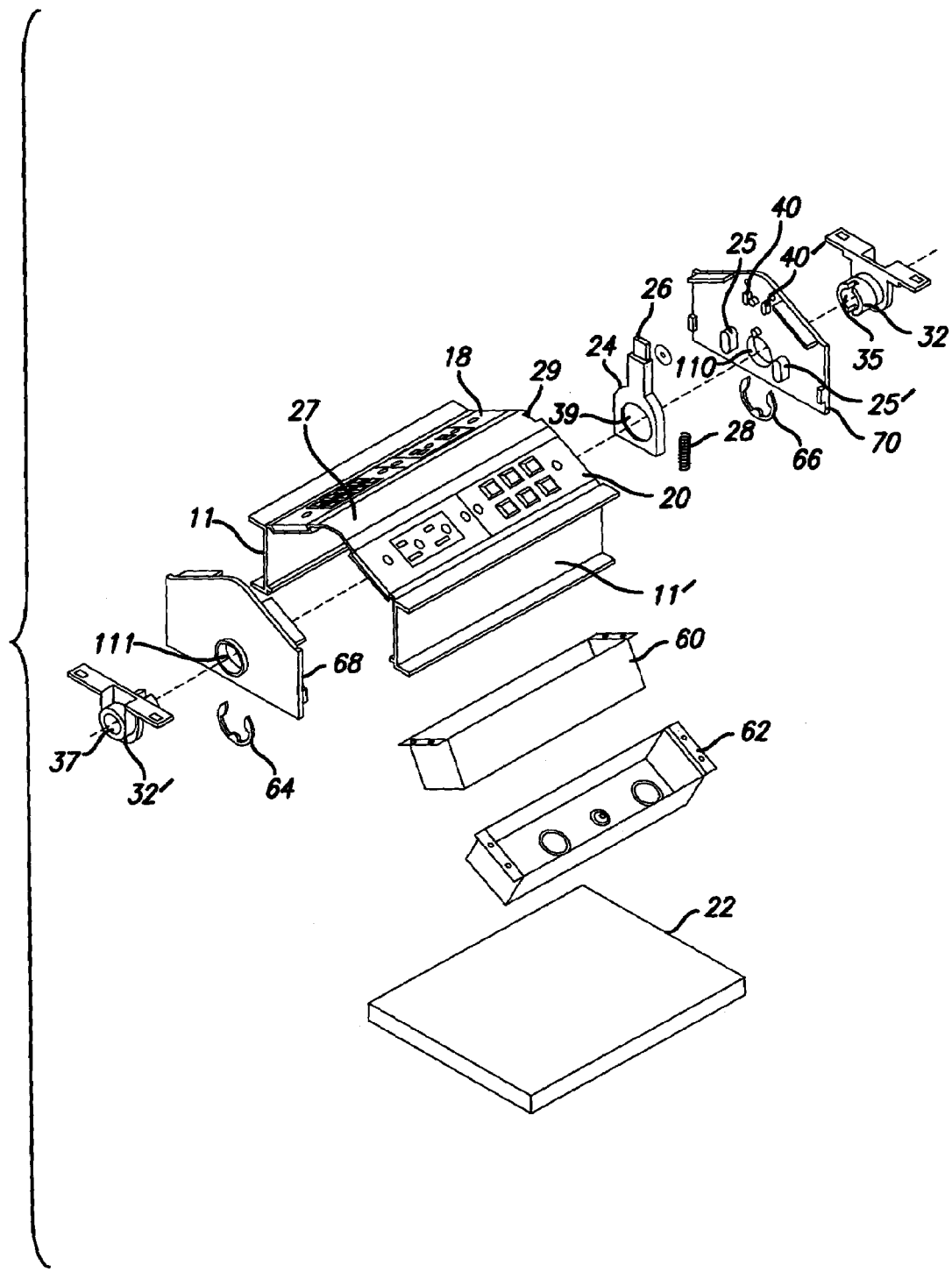

Referring now to FIG. 9, there is shown an exploded view of station 10. Clips 64 and 66 hold torus hinges 32 and 32' in place in end plates 68 and 70. End plates 68, 70 have center holes 110 and 111, which line up with center holes 35 and 37 of torus hnges 32, 32' and with center hole 39 of lock bolt 24. Cans 60 and 62, which attach underneath panels 18 and 20, hold the power and data components.

The components of the station are preferably made of metal, such as aluminum or steel.

We claim:

1. A power and data station rotatably mounted in an opening in a work surface comprising, a base having sloped power and data receptacle panels, a pair of torus hinges attached to said work surface and rotatably attached to said base, a lock bolt having a lock tooth fixedly attached to said base, a lock button slidably attached to said lock bolt, a first lock strike slot in one of said torus hinges, said lock tooth adapted to engage said lock strike slot to hold said station in said open position.

2. The power and data station of claim 1 further comprising a second lock strike slot in said same torus hinge, 180 degrees opposite to said first lock strike slot, adapted to engage said lock tooth when the station is rotated 180 degrees.

3. The power and data station of claim 2 in which the second lock strike slot is concave curved in shape.

4. The power and data station of claim 1 in which the opening in said work surface is obtained by cutting out a panel of said work surface, said station being fixedly attached to one side of said panel.

5. The power and data station of claim 1 in which the station is rotatable 180 degrees between an open position and a closed position.

6. The power and data station of claim 5 in which the panel of said work surface fits flush with said work surface when the station is in its closed position.

7. The power and data station of claim 1 further comprising a slot in said base through which said lock bolt passes.

8. The power and data station of claim 1 further comprising a slot in said base through which said lock bolt passes, a spring in said lock bolt which biases said lock bolt to an upper position, said lock bolt pushing said lock bolt tooth out of said lock strike slot when said lock bolt is pushed downward against said spring.

9. A power and data station rotatably mounted in an opening in a work surface comprising, a base having sloped power and data receptacle panels, a pair of torus hinges attached to said work surface and rotatably attached to said base, a lock bolt having a lock tooth fixedly attached to said base, a lock button slidably attached to said lock bolt, a first lock strike slot in one of said torus hinges, said lock tooth adapted to engage said lock strike slot to hold said station in an open position, wherein said station base is fixedly attached to one side of a panel which fits flush in said opening in said work surface and said station is rotatable on said torus hinges, 180 degrees between an open position and a closed position.

10. The power and data station of claim 9 further comprising a slot in said base through which said lock bolt passes a spring which biases said lock bolt to an upper position, said lock bolt pushing said lock bolt tooth out of said lock strike slot when said lock bolt is pushed downward against said spring.

11. The power and data station of claim 9 wherein said panel is cut out from the work surface or is cut to fit in said opening in said work surface.

12. The power and data station of claim 11 in which said panel matches said work surface in color and texture.

13. The power and data station of claim 10 further comprising a second lock strike slot in said same torus hinge, 180 degrees opposite to said first lock strike slot, adapted to engage said lock tooth when the station is rotated 180 degrees.

14. The power and data station of claim 2 in which the second lock strike slot is concave curved in shape.

15. A power and data station rotatably mounted in an opening in a work surface comprising, a base having sloped power and data receptacle panels, a pair of torus hinges attached to said work surface and rotatably attached to said base, a lock bolt having a lock tooth fixedly attached to said base, a lock button slidably attached to said lock bolt, a first lock strike slot in one of said torus hinges, said lock tooth adapted to engage said lock strike slot to hold said station in an open position, wherein said station base is fixedly attached to one side of a panel which fits flush in said opening in said work surface and said station is rotatable on said torus hinges, 180 degrees between an open position and a closed position, further comprising a second lock strike slot in said same torus hinge, 180 degrees opposite to said first lock strike slot, adapted to engage said lock tooth when the station is rotated to its closed position.

16. The power and data station of claim 15 further comprising a slot in said base through which said lock bolt passes, a spring which biases said lock bolt to an upper position, said lock bolt pushing said lock bolt tooth out of said lock strike slot when said lock bolt is pushed downward against said spring.

17. The power and data station of claim 15 wherein said panel is cut out from the work surface or is cut to fit in said opening in said work surface.

18. The power and data station of claim 15 in which the second lock strike slot is concave curved in shape.

19. The power and data station of claim 1, 9, or 15 further comprising a stop block attached to said torus hinges adapted to stop the rotation of said station in a horizontal position.

20. The power and data station of claim 1, 9, or 15 further comprising a center hole in said torus hinges, which allow for the passage of wires.

\* \* \* \* \*